Figure 1:
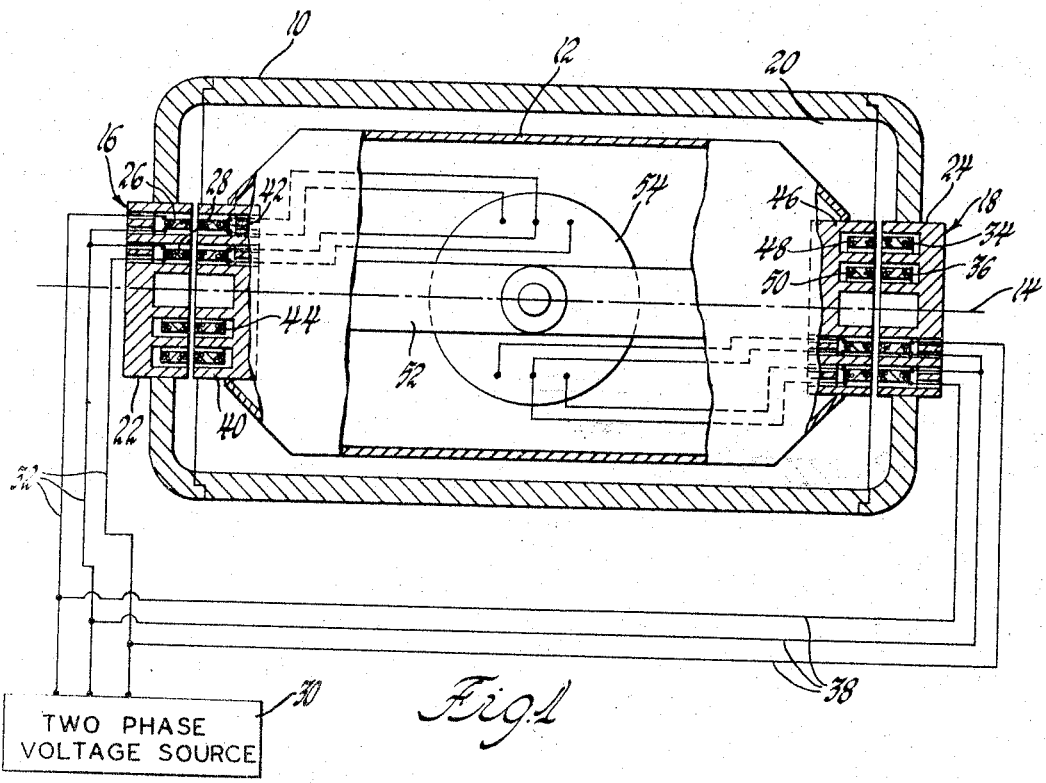

April 25, 1967 R. F. WOLF 3,316,032
POLY-PHASE MAGNETIC SUSPENSION TRANSFORMER
Filed Feb. 17, 1964

INVENTOR.
Robert F. Wolf
BY
Hugh L. Fisher
ATTORNEY

United States Patent Office 3,316,032
Patented Apr. 25, 1967

3,316,032
POLY-PHASE MAGNETIC SUSPENSION TRANSFORMER
Robert F. Wolf, Radford, Va., assignor to General Motors Corporation, Detroit, Mich., a corporation of Delaware
Filed Feb. 17, 1964, Ser. No. 345,439
5 Claims. (Cl. 308—10)

This invention relates to a system for magnetically suspending a body free from physical contact with surrounding elements and, further, to the combination of such a suspension system with a polyphase transformer for supplying power to an electrical load carried by the body without the use of connecting wires between the body and the surrounding elements.

Magnetic suspension systems for levitating or freely suspending a body out of mechanical contact with the surroundings thereof are widely employed where it is desired to isolate the body from surroundings which are subject to changes in orientation. A common example of such a system is a gyroscope wherein a rotor assembly is freely suspended by forces generated by electromagnets disposed about the assembly. So suspended, the rotor assembly is free to maintain an inertial reference poition irrespective of changes in the orientation of the surroundings. Such a system as applied to a single degree of freedom gyro is shown in United States Patent No. 3,146,038, filed February 7, 1962, and issued August 25, 1964, in the name of Argyle G. Lautzenhiser and assigned to the General Motors Corporation.

Where an electrical load device is carried by the suspended body, such as, for example, a motor used to drive the rotor of the aforementioned rotor assembly, power may be supplied thereto by means of flexible leads. However, such leads yield undesirable consequences in that they limit the relative rotation of the body and may impose unwanted reaction torques thereon.

A system for eliminating the necessity of flexible leads between the rotor assembly and the surrounding elements by combining a magnetic suspension system and a power supply transformer is disclosed in United States Patent No. 3,199,932, filed March 1, 1962, and issued August 10, 1965, in the name of Harold E. Clark, and assigned to the General Motors Corporation. In accordance with that disclosure, the body is suspended between two electromagnets, each of which includes a primary coil excited by an A.C. voltage. At least one secondary coil is disposed on the body and magnetically linked to a primary winding such that an A.C. voltage is induced therein corresponding to the voltage of the source which is used to excite the electromagnets. Thus, the electromagnets may provide support and also transfer energy to the load. According to a specific embodiment of the invention disclosed in the Clark application, a two-phase electrical load carried by the body is connected through two such electromagnet transformers which are individually connected to separate phases of a two-phase supply voltage such that one phase of the load is supplied by one electromagnet and the other phase of the load is supplied by the other electromagnet.

It is the general object of this invention to further improve upon the suspension systems shown in the prior art and, more particularly, to improve upon the combination suspension system and power supply disclosed in the Clark application cited above. In accordance with the present invention, a body carrying a polyphase load device, such as a motor, is freely suspended by magnetic forces provided by a plurality of electromagnets and polyphase power is supplied to the load without the use of flexible leads. In addition, all of the phases of the polyphase load device are supplied by each of the electromagnets such that any displacement of the body relative to the electromagnets equally effects all of the phases of the supplied power. In general, this is accomplished by the combination of first and second electromagnets disposed adjacent but spaced from opposite ends of the body along a suspension axis which normally corresponds with an axis of symmetry of the body. Each of the electromagnets includes a plurality of primary coils, each of which is symmetrically disposed about the suspension axis. Magnetic means are disposed on opposite ends of the body along the axis of symmetry so as to be adjacent the first and second electromagnets. The primary coils are connected to a source of polyphase alternating voltage such that each phase of the supply voltage is connected across a particular coil in each of the electromagnets. In effect, the polyphase source is, thus, commonly connected to both of the electromagnets to supply the polyphase voltage to each. First and second pluralities of secondary coils are disposed on the body adjacent the electromagnets so as to be magnetically linked with the primary coils. In this position, the primary and secondary coils form two polyphase transformers, one on each end of the body. The body carries a polyphase electrical load device such as a polyphase motor having a plurality of independent sets of stator windings. Circuit means are provided for connecting one set of secondary coils to one set of stator windings and also for connecting the other set of primary coils to the other set of stator windings. Since all of the phases which are to be supplied to the load device enter through both sides of the body it can be seen that any displacement of the body relative to the electromagnets, as for example caused by an acceleration of the body, has an equal effect on all phases of the power supplied to the load.

Figure 2:
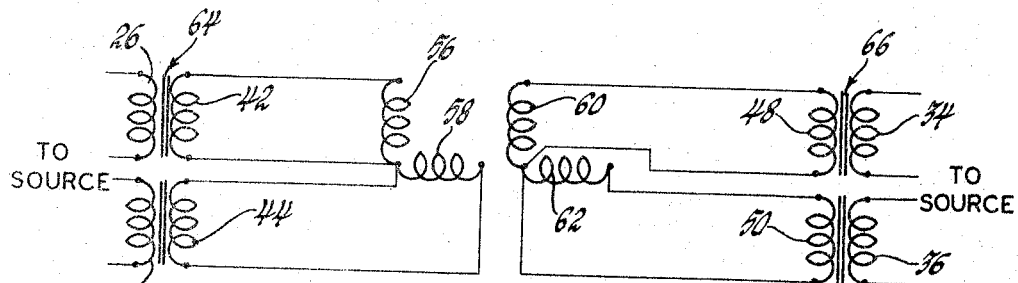

The invention, as well as the advantages and operation thereof, may be best understood by reference to the following description of a specific embodiment thereof. This description is to be taken with the accompanying drawings of which:

FIGURE 1 is a plan view partly in cross-section of a specific embodiment of the invention; and FIGURE 2 is a schematic wiring diagram for the embodiment of FIGURE 1.

Referring now to the specific embodiment shown in FIGURE 1, a fluid-tight cylindrically shaped casing 10 has suspended therein a hollow body 12 having a generally cylindrical shape and having a longitudinal axis of symmetry 14. The body 12 is magnetically suspended within the casing 10 and out of contact therewith by means of electromagnets 16 and 18 which are fixed to the casing 10 adjacent opposite ends of the body 12 and which are normally disposed along the axis of symmetry 14. The space 20 between the casing 10 and the body 12 is filled with a viscous fluid which is generally chosen to provide a buoyant force on the body 12 equal to the force of gravity thereon. For purposes of discussion it may be assumed that the body 12 is a gyroscope float assembly such as may be used in an inertial guidance system.

Electromagnets 16 and 18 are substantially similar and include ferrite cup members 22 and 24 respectively. Each of the cup members 22 and 24 is attached to the casing 10 and has formed therein a plurality of concentric annular slots which open toward the interior of the casing 10. The cup members 22 and 24 are coaxial as suggested in FIGURE 1. Disposed within the annular slots of the electromagnet 16 are two primary coils 26 and 28. The primary coils 26 and 28 are respectively connected to opposite phases of a two-phase voltage source 30 by means of the conductors 32. Electromagnet 18 also includes a pair of primary coils 34 and 36 disposed within the annular slots of the cup member 24. The primary coils 34 and 36 are also connected to respective phases of the two-phase voltage source 30 by means of conductors 38. Thus, it can be seen that all phases of the voltage source 30 are supplied to each of the electromagnets 16 and 18.

Disposed on the left-hand side of the gyro float assembly 12 as shown in FIGURE 1 is a ferrite cup member 40 which is substantially similar to the cup member 22 and is similarly provided with a plurality of concentric annular slots which open toward the slots in the cup member 22. Disposed within the slots are secondary coils 42 and 44 which are magnetically linked with the primary coils 26 and 28 across the gap between cup members 22 and 40. Thus, the combination of cup members 22 and 40, primary coils 26 and 28, and secondary coils 42 and 44 defines a first two-phase transformer 64 as suggested in FIGURE 2.

On the right-hand side of the gyro float assembly 12 as shown in the drawing is a corresponding ferrite cup member 46 having formed therein a plurality of concentric annular slots which correspond with those slots in the cup member 24. Disposed within the slots in the cup member 46 is a pair of secondary coils 48 and 50 which are magnetically linked with the primary coils 34 and 36 respectively. Thus, cup members 24 and 46, primary coils 34 and 36, and secondary coils 48 and 50 define a second two-phase transformer 66 as suggested in FIGURE 2.

The gyro float assembly 12 includes a gimbal assembly 52 which supports a two-phase motor 54. The motor 54 is provided for driving a rotatable inertial element, not shown, within the gyro float assembly. As more clearly shown in FIGURE 2, the motor 54 is provided with two sets of stator windings 56, 58 and 60, 62. As shown in FIGURE 2, stator winding 56 is connected to one phase of the two-phase voltage source 30 across the portion of transformer 64 including primary coil 26 and secondary coil 42. Stator winding 58 is connected to the other phase of source 30 by means of the combination of primary coil 28 and secondary coil 44. Looking to the other set of stator windings, winding 60 is connected to one phase of the source 30 across the portion of transformer 66 including primary and secondary coils 34 and 48 respectively, while winding 62 is connected to the other phase of source 30 across the combination of primary and secondary coils 36 and 50 respectively.

As previously described, the liquid in space 20 in the casing 10 effectively compensates for the weight of the gyroscope float assembly 12 such that when no accelerations are encountered, the assembly 12 is maintained in a normal position wherein the electromagnets 16, 18 maintain the entire assembly in a position of symmetry about the axis 14 as shown in FIGURE 1. In addition, the electromagnets 16 and 18 are effective to maintain the gyro float assembly 12 in a central position between the cup members 22 and 24. It may also be seen that because of the particular structure of the ferrite cup members of the electromagnets 16 and 18, a minimum magnetic reluctance to the flux generated by the system primary coils, will be encountered when the system is in the position shown in FIGURE 1. Any deviation, either axially or radially, will disturb the minimum energy conditions and, thus, the magnetic suspension system will automatically tend to compensate for this deviation.

Accordingly, any axial shifting of the body 12 tends to lower the reluctance between the ferrite cup members of one of the electromagnets and increase the reluctance between the ferrite cup members of the other electromagnets. An increase in reluctance causes a primary current increase tending to increase the attractive force between the slotted ferrite cups. Conversely, decreased reluctance due to a smaller axial gap causes a primary current decrease and a decreased attractive force. Thus, forces are generated within the system tending to return the body 12 to the centralized position. Any radial movement of the body 12 with respect to the casing 10 produces a decrease in the overall area of the facing surfaces of the annular rings between the slots of the ferrite cup members in the electromagnets 16 and 18, and thus, increases the magnetic reluctance across the air gaps. Such radial shifts produce a deviation from a minimum energy, or equilibrium, condition. Accordingly, forces are generated tending to return the body 12 to a position of radial symmetry.

In addition to providing magnetic support for the body 12 as described above, it can also be seen that the electromagnets 16 and 18 form respective parts of transformers 64 and 66 for connecting the two-phase voltage from source 30 to the motor 54 without the use of leads between the casing 10 and the body 12. As previously described, this advantageously eliminates any unwanted reaction torques which might otherwise affect the overall accuracy of the system within which the gyro float shown in FIGURE 1 is included. A particular advantage of the circuit connection shown in FIGURE 2 is that all phases of the polyphase motor 54 are connected through each of the transformers 64 and 66. Accordingly, any displacement of the body 12 relative to the electromagnets 16 and 18 has an equal effect on all phases of the voltage supplied to the motor 54 and the proper phase displacement is therefore maintained. It will be apparent to those skilled in the art that the present invention is not limited to a two-phase motor and source combination as shown in the drawings, but may be extended to a polyphase combination having any desired number of phases.

It is to be understood that the specific embodiment described above is not to be construed in a limiting sense. For a definition of the invention, reference should be made to the appended claims.

What is claimed is:
1. A combination magnetic suspension system and power supply transformer comprising, a freely suspended body having an axis of symmetry, first and second electromagnets disposed adjacent but spaced from opposite ends of the body along a suspension axis normally corresponding with the axis of symmetry, each of the electromagnets including a plurality of primary coils disposed substantially normal to and coaxial with said suspension axis, each of the primary coils being electrically independent from the others of said plurality, a source of polyphase alternating voltage, the number of phases of the voltage corresponding to the number of coils in each of the pluralities of coils, the phases of the voltage source being connected in order across respective primary coils in each of the first and second electromagnets, first and second pluralities of secondary coils equal in number to the number of primary windings disposed on opposite ends of the body adjacent the primary coils of the first and second electromagnets respectively and coaxial therewith, each of the secondary coils being electrically independent from the others of said pluralities, first and second magnetic means disposed on the body in magnetic proximity to the first and second electromagnets and adjacent the secondary coils for transferring polyphase electrical energy between the primary and secondary coils and responsive to the first and second electromagnets for suspending the body by the attractive magnetic forces between the respective electromagnets and magnetic means, a polyphase electrical load carried by the body, and circuit means connecting the secondary coils of the first and second electromagnets to the load.

2. A combination magnetic suspension system and power supply transformer comprising, a freely suspended body, first and second electromagnets disposed adjacent opposite ends of the body and along a suspension axis, each of the electromagnets comprising a plurality of electrically independent primary coils disposed coaxially about said axis, first and second magnetic means disposed on the body adjacent the first and second electromagnets respectively and spaced therefrom, a source of poly-phase alternating voltage, all of the phases of the voltage source being connected in order across respective primary coils in each of the first and second electromagnets whereby the body is suspended by the attractive magnetic forces between the first and second electromagnets and the first and second magnetic means respectively, first and second pluralities of electrically independent secondary coils disposed on opposite ends of the body adjacent the primary coils of the first and second electromagnets respectively, each of the secondary coils being magnetically linked with an individual primary coil in the adjacent plurality whereby a poly-phase alternating voltage corresponding with that of said source is induced in each of the pluralities of secondary coils, a poly-phase electrical load carried by the body, and circuit means connecting the secondary coils of the first and second electromagnets to the load.

3. A combination magnetic suspension system and power supply transformer comprising a freely suspended body, first and second electromagnets disposed adjacent opposite ends of the body and along an axis, each of the electromagnets comprising a coplanar array of at least two electrically independent primary coils disposed coaxially about said axis, first and second magnetic means disposed on the body adjacent the first and second electromagnets respectively and spaced therefrom, a source of polyphase alternating voltage, means connecting all of the phases of the voltage source in order across respective primary coils in each of the first and second electromagnets whereby the body is suspended by the attractive magnetic forces between the first and second electromagnets and the first and second magnetic means respectively, first and second pluralities of electrically independent secondary coils equal in number to the number of primary coils disposed on opposite ends of the body adjacent the primary coils of the first and second electromagnets, respectively, each of the secondary coils being magnetically linked with an individual primary coil in the adjacent plurality whereby a poly-phase alternating voltage corresponding with that of said source is induced in each of the pluralities of secondary coils, a polyphase motor carried by the body and having two independent stator windings for each phase thereof, first circuit means individually connecting the first plurality of secondary coils to respective first stator windings and second circuit means individually connecting the second plurality of secondary coils to respective second stator windings.

4. A combination magnetic suspension system and poly-phase power supply transformer comprising, a freely suspended body, first and second electromagnets disposed adjacent but spaced from opposite ends of the body and along a suspension axis normally corresponding with an axis of symmetry of the body, each of the electromagnets comprising a first body of magnetic material having formed therein a plurality of concentric annular grooves disposed coaxially with the suspension axis, and a plurality of primary coils disposed in said grooves, first and second magnetic secondary means disposed on opposite ends of the body along the axis of symmetry, each of the secondary means comprising a second body of magnetic material having formed therein a plurality of concentric annular grooves disposed coaxially with the axis of symmetry and normally facing and corresponding to the grooves in the first bodies, and a plurality of secondary coils disposed in said grooves, a source of poly-phase alternating voltage, the phases of the voltage being connected across respective primary coils in each of the first and second electromagnets whereby the body is suspended by the attractive magnetic forces between the first and second electromagnets and the first and second magnetic secondary means respectively, the secondary coils being magnetically linked with the primary coils whereby a poly-phase voltage is induced in the secondary coils corresponding with that of the source, a poly-phase motor carried by the body and having two independent stator windings for each phase thereof, first circuit means individually connecting the coils of the first secondary means to respective first stator windings, and second circuit means individually connecting the coils of the second secondary means to respective second stator windings.

5. A combination magnetic suspension system and two-phase power supply transformer for a gyro rotor assembly comprising a housing, a gyro rotor assembly disposed within the housing to be freely suspended therein, first and second electromagnets mounted on the housing adjacent but spaced from opposite ends of the assembly and along a suspension axis normally corresponding with an axis of symmetry of the assembly, each of the electromagnets comprising a first body of magnetic material having formed therein two concentric annular grooves disposed coaxially with the suspension axis and two primary coils disposed in respective grooves, first and second magnetic secondary means disposed on opposite ends of the assembly along the axis of symmetry, each of the secondary means comprising a second body of magnetic material having formed therein two concentric annular grooves disposed coaxially with the axis of symmetry and two secondary coils disposed in respective grooves, the grooves of the second bodies being adjacent and facing the grooves of the first bodies when the suspension axis and the axis of symmetry coincide, a source of two-phase alternating voltage, the phases of the voltage being connected across respective primary coils in each of the first and second electromagnets to suspend the assembly between the electromagnets by the attractive magnetic forces produced thereby and to induce a two-phase voltage in the secondary coils, a two-phase motor carried by the assembly and having two independent stator windings for each phase thereof, first circuit means individually connecting the coils of the first secondary means to respective first stator windings and second circuit means individually connecting the coils of the second secondary means to respective second stator windings.

References Cited by the Examiner
UNITED STATES PATENTS
3,199,932  8/1965  Clark _____ 308—10

MILTON O. HIRSHFIELD, *Primary Examiner.*

J. J. SWARTZ, *Assistant Examiner.*